United States Patent [19]

Swartout et al.

[11] Patent Number: 4,605,048
[45] Date of Patent: Aug. 12, 1986

[54] STAIR STEP ROUTING TEMPLATE

[76] Inventors: James J. Swartout, 5663 County Rd. 616, East Cedar, Mich. 49621; William D. Scott, 10795 Dalzell Rd., Traverse City, Mich. 49684

[21] Appl. No.: 661,606

[22] Filed: Oct. 17, 1984

[51] Int. Cl.[4] .................................................. B27C 5/00
[52] U.S. Cl. ........................ 144/136 B; 144/134 R; 144/144.5 R
[58] Field of Search ................... 144/27, 144.5; 134 R, 144/136 R, 136 B

[56] References Cited

U.S. PATENT DOCUMENTS

| | | |
|---|---|---|
| 374,493 | 12/1887 | Parry . |
| 483,671 | 10/1892 | Greaves . |
| 487,589 | 12/1892 | Taylor . |
| 487,889 | 12/1892 | Martin . |
| 626,718 | 6/1899 | Pearson et al. . |
| 909,636 | 1/1909 | Montgomery . |
| 931,552 | 8/1909 | Ahlers . |
| 1,042,120 | 10/1912 | Kelley . |
| 1,552,881 | 9/1925 | Rose . |
| 1,615,213 | 1/1927 | Carter . |
| 1,751,816 | 3/1930 | Hunter . |

OTHER PUBLICATIONS pp. 5–6 of the Power Tool Division, Rockwell International catalog.

Primary Examiner—W. D. Bray
Attorney, Agent, or Firm—Price, Heneveld, Huizenga & Cooper

[57] ABSTRACT

The specification discloses a template for routing stair stringers. The template includes (1) a body having opposite faces and defining tread and riser routing slots and (2) structure for registering the template body on a stringer to provide a fixed tread depth and an adjustable riser height. Preferably, at least a portion of the registration structure is transversely shiftable within the template body to provide an unobstructed routing face regardless of which template face is laid against the stringer.

20 Claims, 5 Drawing Figures 4,605,048

STAIR STEP ROUTING TEMPLATE

BACKGROUND OF THE INVENTION

The present invention relates to routing templates and more particularly to such templates adapted for routing stair stringers.

A wide variety of templates has been developed for routing wooden or other stair stringers. Typically, such a template includes a body defining generally perpendicularly oriented tread and riser slots and a clamping structure for securing the template to the stringer. After the template is properly positioned, a router is run along and within the tread and/or riser slots to form the recesses in the stringer for receiving the boards which form the treads and risers. The recesses routed into the stringers enhance the structural integrity of the staircase and provide an aesthetically jointed construction. Known templates are however either unadjustable or, if adjustable, relatively complicated and cumbersome.

One known adjustable stair step routing template is disclosed in U.S. Pat. No. 1,552,881, issued Sept. 8, 1925, to Rose, and entitled SPINDLE MOLDING MACHINE FOR WOOD. The template includes a pair of linear guides adjustably secured to opposite sides of the template body to register with scales indicating the selected tread depth and riser height. This template, however, has several drawbacks. The linear guides which extend from both sides of the template prohibit the direct use of a router in conjunction with the template. Consequently, a relatively complicated follower assembly is required to rout the stringer. Second, adjustment of the Rose template is relatively difficult because the linear guides can be adjusted only by loosening both wing nuts, adjusting the guides, and resecuring the wing nuts. An adjustment to the tread depth affects the riser height and vice-versa, further complicating adjustment. Finally, the linear guide can be knocked out of adjustment.

Other templates have been developed which are not adjustable and therefore provide a fixed tread depth and riser height. Although these templates are useful on a standard width board for a standard size stair, they are unsuitable for general purpose use wherein the board width and stair measurements vary.

SUMMARY OF THE INVENTION

The aforementioned problems are overcome in the present invention. Essentially, a stair step routing template is provided which is readily, yet securely, adjustable to provide a variable riser height with a standard tread depth. Further, the adjustable template is easily transferred between opposite stair stringers because the template need not be readjusted when moving from one stringer to the opposite stringer. Still further, a router can be used directly in conjunction with the template.

More particularly in a first aspect of the invention, the template includes a body defining tread and riser routing slots, registration points shiftably mounted within the template body to extend from only one side thereof, and a clamp for securing the template body to a stringer between the engagement points and the clamp. The shiftably mounted engagement members drop below the body when the template is laid on a stringer for routing. Consequently, the registration members are automatically positioned for clamping as the template is positioned and do not extend upwardly beyond the upper surface of the template, leaving an unobstructed area over which the router can be run. This structure enables the template to be readily shifted between opposite stringers without having to alter the riser height adjustment.

In a second aspect of the invention, the template includes a body defining tread and riser slots, a tread registration point for engaging a stringer to provide a standard tread depth, and an adjustable riser registration point to provide a variable riser height. In a preferred embodiment, the riser registration point includes a slot within the template body, a screw extending axially through the slot, and a registration member threadably supported on the screw enabling height adjustment to be easily, yet securely, effected by simply rotating the screw. This structure enables stair configuration to be easily, yet simply, selected as desired for aesthetic and functional purposes.

These and other objects, advantages, purposes, and features of the invention will be more readily understood and appreciated by reference to the detailed description of the preferred embodiment and the drawings.

BRIEF DESCRIPTION OF THE DRAWINGS

FIG. 3 is a fragmentary sectional view taken along plane III—III in FIG. 1;

DETAILED DESCRIPTION OF THE PREFERRED EMBODIMENT

Figure 1:
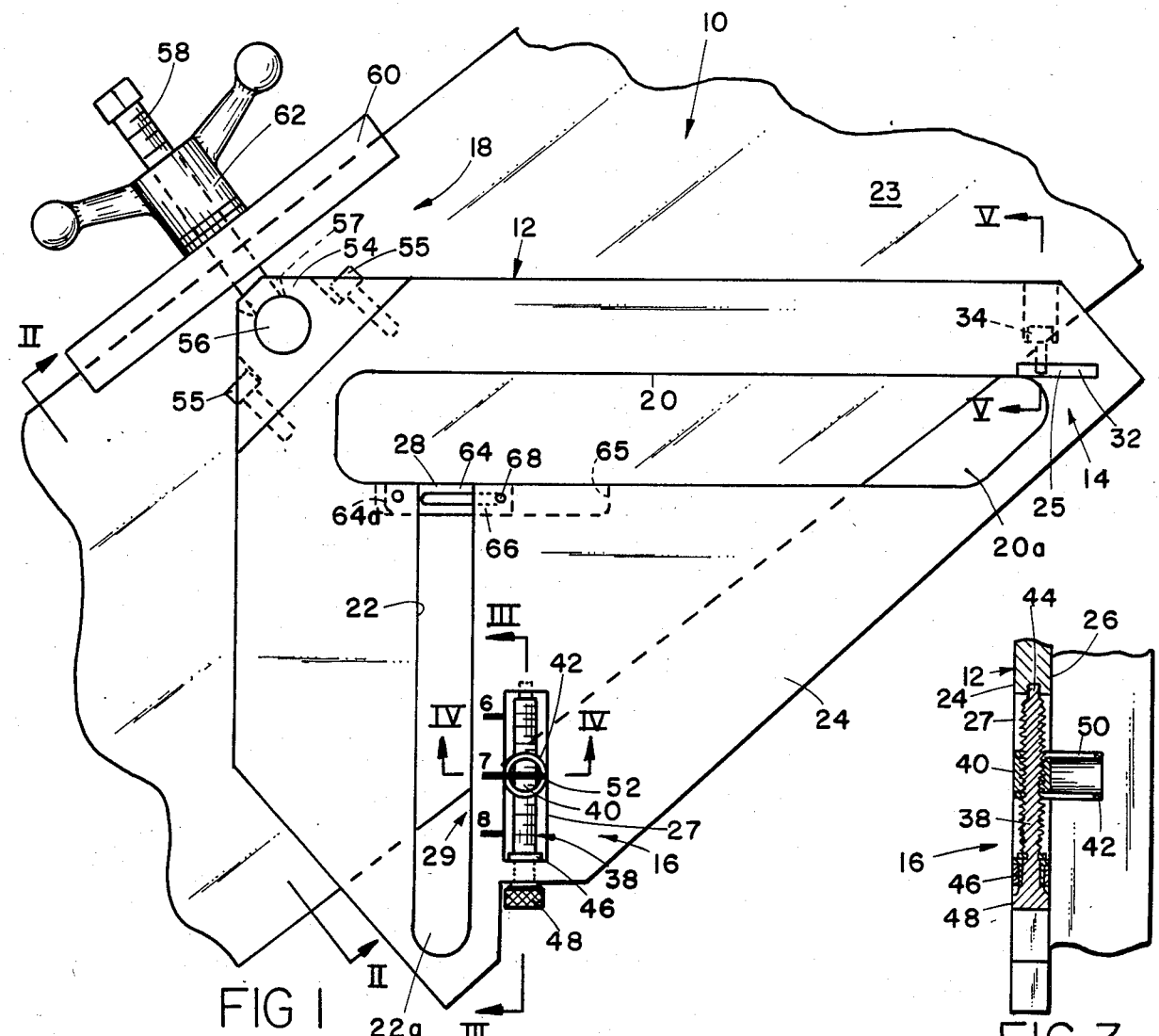
FIG. 1 is a top plan view of the routing template of the present invention mounted on a stair stringer.

A routing template constructed in accordance with a preferred embodiment of the invention is illustrated in the drawings and generally designated 10. Generally, the template includes body 12, tread registration assembly 14, riser registration assembly 16, and clamp assembly 18. Body 12 defines tread slot 20 and riser slot 22 communicating with slot 20. Riser pivot assembly 16 is adjustable to provide a variable riser height. Registration assemblies 14 and 16 register slots 20 and 22 with respect to stringer 23. In use, the riser height is selected and adjusted on assembly 16; template 10 is secured to stringer 23 between registration assemblies 14 and 16 and clamp 18; and a router (not shown) is run along and within slots 20 and 22 to form recesses in the stringer which receive the tread (not shown) and riser (not shown).

Turning more specifically to the construction of template 10, body 12 (FIGS. 1 and 2) is a generally planar member fabricated of aluminum stock. Body 12 includes a pair of opposite, generally planar faces or sides 24 and 26, either of which can be laid against stringer 23 as will be described. Body 12 includes tread slot 20 and riser slot 22 oriented generally perpendicularly to one another and communicating at junction 28. Both of slots 20 and 22 extend completely through body 12 from face 24 to face 26 and have sidewalls oriented generally perpendicularly to the faces but generally parallel to one another across each respective slot. Optionally, the sidewalls can be angled, or wedge-shaped, i.e., converge toward one end of the respective slot, depending upon the wood used to provide a tighter fit between stringer 23 and the treads and risers. Starting area ends 20a and 22a are provided in slots 20 and 22, respectively, to provide areas at which the router can be started before engaging the rotating router bit with stringer 23. Body 12 also defines slots 25 and 27 which receive registration assemblies 14 and 16, respectively, and also extend completely through body 12. Both slots 25 and 27 are elongated and rectilinear--slot 25 being parallel to tread slot 20 and slot 27 being parallel to tread slot 22. Body 12 further includes an integral scale 29 adjacent riser slot 22.

Figure 5:
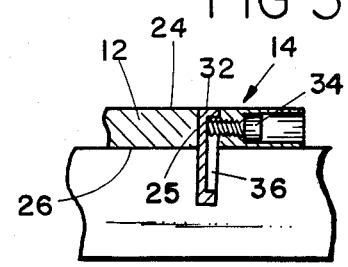
FIG. 5 is a fragmentary sectional view taken along plane V—V in FIG. 1.

Tread registration assembly 14 (FIGS. 1 and 5) is supported in template body 12 adjacent slot end 20a. Tread registration member 32 is slidably supported within slot 25 and retained therein by set screw 34 which extends into channel 36 of registration member 32. Consequently, set screw 34 limits the travel of registration member 32 within slot 30 as determined by the length of slot 36. Registration member 32 shifts transversely with respect to the faces of body 12 and, when fully moved in either direction, lies flush with one face or the other (see FIG. 5). Therefore, when template 10 is laid on a stringer, registration member 32 drops to the position illustrated in FIG. 5 to provide an engagement means against the stringer while lying flush with upper face 24. Alternatively, when template 12 is turned over such that face 26 is up, registration member 32 will slidably shift such that it lies flush with face 26 while its opposite end extends below face 24. Tread registration assembly 16 is nonadjustable with respect to the length of slot 20 such that template 10 provides a fixed tread depth which cannot be altered.

Figure 4:
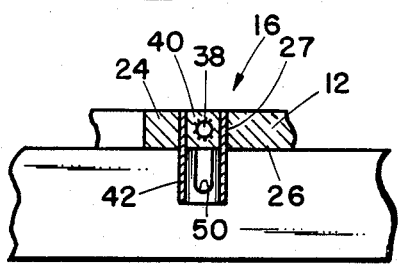
FIG. 4 is a fragmentary sectional view taken along plane IV—IV in FIG. 1.

Riser registration assembly 16 (FIGS. 1, 3, and 4) enables the riser height to be adjusted preferably between six and eight inches as indicated on scale increments 29. Basically, assembly 16 includes thumb screw 38, pin 40, and contact cylinder 42. Thumb screw 38 is rotatably supported within elongated slot 27 of body 12 and is oriented axially within that slot 27. More particularly, screw 38 includes a cylindrical projection or pilot 44 extending into body 12 and bushing 46 supporting the opposite end of the screw. Knurled portion or screw head 48 enables the screw to be easily rotated by hand. Generally cylindrical pin 40 is threadably carried on screw 38. The screw extends diametrially through the cylindrically shaped pin 40. The height of the pin is generally identical to the thickness of body 12. Sliding cylinder 42 is a tubular member closely received about pin 40. Cylinder 42 includes a pair of opposite longitudinal slots 50 which receive screw 38 and permit the cylinder to slide axially with respect to pin 40 to extend from one side or the other of body 12. The length of slots 50 determine the travel of cylinder 42. The diameter of cylinder 42 is slightly less than the width of slot 27. Both pin 40 and cylinder 42 include aligned slots 52 in their upper surface which are alignable with one of the scale marks 29 to indicate the selected riser height.

The position of contact cylinder 42 is adjusted by rotating thumb screw 38 which carries pin 40 axially within slot 27. Contact cylinder 42 travels with pin 40. When template 10 is laid on stringer 23, contact cylinder 42 drops to the position illustrated in FIG. 4 extending from undersurface 26 of body 12. Consequently, the contact cylinder engages one edge of stringer 23, while the upper end of the cylinder is flush with upper surface 24 of body 12. When the template is turned over for use on the opposing stringer, contact cylinder 42 slides the opposite way such that it extends below surface 24 and has one end flush with surface 26.

Figure 2:
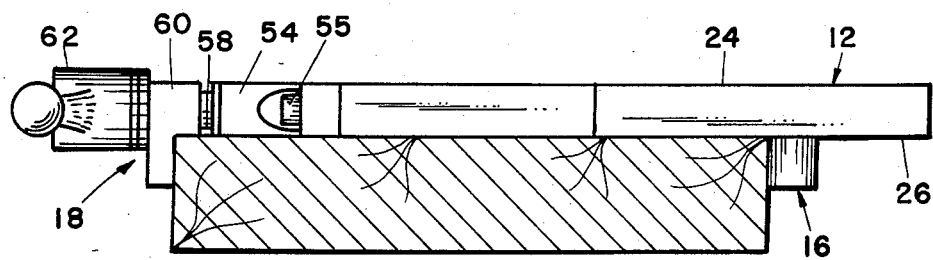
FIG. 2 is an end view taken along plane II—II in FIG. 1.

Clamping assembly 18 (FIGS. 1 and 2) is secured to body 12 generally opposite registration assemblies 14 and 16 to secure a stringer therebetween. Generally, assembly 18 includes triangular block 54 secured to body 12 by screws 55. Optionally, one or more spacer blocks (not shown) can be installed between block 54 and body 12 to accommodate stringers of drastically larger widths. Pivot socket 56 is pivotally supported within a cylindrical bore in block 54 to threadedly receive post 58, which is therefore free to pivot within V-slot 57. L-shaped bracket 60 is carried on post 58 to engage one edge of stringer 23 as illustrated in FIG. 2. Wing bolt 62 is threaded on post 58 to tighten bracket 60 against the stringer. The pivotal support of post 58 within block 54 enables the post to be oriented generally perpendicularly to stringer 23 regardless of the adjustment of riser registration assembly 16 which changes the angle of the template on the stringer.

Slide block 64 (FIG. 1) enables riser slot 22 to be closed off from tread slot 20. Block 64 is slid closed when routing of a tread only without a riser recess is desired. This may be desired for exterior steps, for instance. Riser block 64 is slidably mounted in a slot 65 formed parallel to tread slot 20 and communicating therewith. Slot 65 also opens into riser slot 22 such that block 64 can be slid thereacross. Riser block 64 includes slot 66 which rides on pin 68 supported within body 12 transverse to the direction of slot 65. Block 64 can be shifted between the position illustrated in FIG. 1 and a second position (not shown) wherein block 64 is shifted to the right such that left end 64a is generally even with the wall of slot 22.

OPERATION

Stair risers are easily, effectively, and simply routed from wooden boards or other materials using the template of the present invention. Before template 10 is mounted on stringer 23, riser registration assembly 16 must be adjusted to select the riser height. Thumb screw 38 is rotated in a clockwise or counterclockwise direction until alignment groove 52 in pin 40 is aligned with the desired mark on scale 29 on body 12. Template 10 is then laid on stringer 23 whereupon registration plate 32 and registration cylinder 42 drop below template body 12 to engage one edge of the stringer and thereby register tread slot 20 and riser slot 22 with respect to the stringer. Registration plate 32 and registration cylinder 42 are then flush with upper face 24 which is, therefore, unobstructed. Clamp assembly 18 is tightened with bracket 60 against the opposite edge of stringer 23 from registration assemblies stringer between those registration assemblies clamp assembly 18 on the other edge. Pivot cylinder 56 permits post 58 to "float" as necessary so that brace 60 is always in full abutment with the edge of the stringer. Slide block 64 is slid to the right (in FIG. 1) to open tread slot 22 if both tread and riser receses are to be routed, and is slid to the left to close the tread slot if only tread recesses are to be routed. The recesses are then routed using a conventional router run about the interior of slots 20 and 22. Starting ends 20a and 22a of the slots provide an area in which the router can be started before actually engaging stringer 23.

The opposite stringer, which must be routed as a mirror image of the first stringer, is easily routed without changing the adjustment of template 10. Template 10 is removed from the first stringer by loosening clamping assembly 18. Face 24 is laid against the opposite stringer whereupon registration plate 32 and registration cylinder 42 drop to the opposite side of template body 12 to engage the second stringer. Bracket 60 is rotated 180 degrees about post 58, and clamping assembly 18 is tightened to secure the template in position with the identical riser height adjustment as on the first stringer. The second stringer is then routed in a conventional fashion.

The above description is that of a preferred embodiment of the invention. Various alterations and changes can be made without departing from the spirit and broader aspects of the invention as set forth in the appended claims which are to be interpreted in accordance with the principles of patent law, including the doctrine of equivalents.

The embodiments of the invention in which an exclusive property or privilege is claimed are defined as follows:

1. A stair stringer routing template comprising:
a template body including opposite first and second planar faces to be laid against a stair stringer, said body defining tread and riser slots;
tread registration means for registering said tread slot with respect to a stair stringer edge;
riser registration means for adjustably registering said riser slot with respect to the stair stringer edge enabling the riser height to be varied, said tread and riser registration means being flush with or below one face when the other face is laid on the stair stringer; and
clamping means for securing said body to a stair stringer with said tread and riser registration means engaging a common edge of the stair stringer.

2. A routing template as defined in claim 1 wherein said riser registration means includes:
said body defining an elongated slot;
a registration member within said slot; and
adjusting means for adjusting the axial position of said registration member within said slot.

3. A routing template as defined in claim 2 wherein said adjusting means includes a screw mounted within said slot.

4. A routing template as defined in claim 3 wherein said registration member includes a pin within said slot and threadably mounted on said screw and a tubular member slidably mounted on said pin to extend out of said slot.

5. A routing template as defined in claim 1 wherein said body includes a scale for displaying the riser height corresponding to the adjustment of said riser registration means.

6. A routing template as defined in claim 1 wherein said tread registration means includes:
said body defining a slot; and
a registration member slidably mounted within said slot to extend out of said slot.

7. A routing template as defined in claim 1 wherein said clamping means includes a clamp pivotally secured to said template body generally opposite said tread and riser registration means.

8. A routing template as defined in claim 1 further comprising means for selectively closing off said riser slot from said tread slot.

9. A stair stringer routing template comprising:
a body defining router slot means, said body including a pair of opposite substantially planar sides enabling said body to be laid on a stair stringer on either of said sides;
registration means secured to said body for engaging one edge of the stair stringer, said registration means being shiftable generally transversely to said sides to be at least flush with said upper body side when said lower body side is laid on a stair stringer; and
clamping means for engaging the opposite edge of the stair stringer to secure the stair stringer between said registration means and said clamping means.

10. A routing template as defined in claim 9 wherein said registration means includes a tread registration member and a riser registration member.

11. A routing template as defined in claim 9 wherein said body defines a pair of slots each extending through said body between said opposite planar sides, and further wherein said tread and riser registration members are slidably mounted within said slots to extend from one side or the other of said body.

12. A routing template as defined in claim 11 wherein said riser registration member is adjustable along the length of the slot in which it is mounted to provide a selectable riser height.

13. A routing template as defined in claim 12 wherein said clamping means is pivotally secured to said body generally opposite said registration means to accommodate variation in adjustment of said riser registration member.

14. A routing template as defined in claim 9 wherein said router slot means includes a tread slot and a riser slot, and further comprising means for closing off said riser slot from said tread slot.

15. A stair stringer routing template comprising:
a body defining a tread slot and a riser slot;
tread registration means for engaging a stair stringer to register said tread slot therewith;
adjustable riser registration means for engaging the stair stringer to adjustably register said riser slot therewith, said riser registration means being adjustable independently of said tread registration means; and
clamping means for securing said body to the stair stringer with said tread registration means and said riser registration means engaging a common stringer edge.

16. A routing template as defined in claim 15 wherein said riser registration means includes:
an elongated slot extending through said body;
a registration member within said elongated slot; and
moving means for axially moving said registration member within said elongated slot.

17. A routing template as defined in claim 16 wherein said moving means includes a screw, and further wherein said registration member includes a pin threadably carried by said screw.

18. A routing template as defined in claim 17 wherein said registration member further includes a tubular piece slidably mounted over said pin to extend out of said slot from either side of said body.

19. A routing template as defined in claim 15 wherein said body includes an integral scale to measure adjustment of said riser registration means.

20. A routing template as defined in claim 15 wherein said clamping means is pivotally secured to said body generally opposite said tread registration means and said riser registration means to accommodate variation in the clamping angle due to adjustment of said riser registration means.

* * * * *

UNITED STATES PATENT AND TRADEMARK OFFICE
CERTIFICATE OF CORRECTION

PATENT NO.  : 4,605,048

DATED       : August 12, 1986

INVENTOR(S) : James J. Swartout et al

It is certified that error appears in the above-identified patent and that said Letters Patent is hereby corrected as shown below:

Column 1, line 62;
      "engagement" should be --registration--.

Column 1, line 63;
      "engagement" should be --registration--.

Column 3, line 25;
      "Alternatively" should be --Alternately--.

Column 3, line 44;
      "diametrially" should be --diametrically--.

Column 4, line 51;
      after "assemblies" and before "stringer" insert
      --14, 16 to secure the--.

Signed and Sealed this

Third Day of March, 1987

*Attest:*

DONALD J. QUIGG

*Attesting Officer*      *Commissioner of Patents and Trademarks*